(12) United States Patent
Nguyen

(10) Patent No.: US 6,572,273 B1
(45) Date of Patent: Jun. 3, 2003

(54) FIBER OPTIC CONNECTOR WITH REMOVABLE ALIGNMENT SLEEVE

(75) Inventor: Can Trong Nguyen, Garden Grove, CA (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 09/707,093

(22) Filed: Nov. 7, 2000

(51) Int. Cl.[7] .................................................. G02B 6/38
(52) U.S. Cl. .............................. 385/59; 385/58; 385/60; 385/71
(58) Field of Search .............................. 385/58, 59, 60, 385/71, 77

(56) References Cited

U.S. PATENT DOCUMENTS

| 3,951,514 A | 4/1976 | Medina, Jr. ................... 350/96 |
| 4,198,122 A | 4/1980 | Prunier et al. ............ 350/96.21 |
| 4,208,092 A | 6/1980 | Monaghan et al. ....... 350/96.21 |
| 4,279,469 A | 7/1981 | Forman .................... 350/96.22 |
| 4,422,716 A | 12/1983 | Morimoto et al. ........ 350/96.21 |
| 5,359,688 A | 10/1994 | Underwood .................. 385/70 |
| 5,373,573 A * | 12/1994 | Welsh ......................... 385/69 |
| 5,542,015 A | 7/1996 | Hultermans ................... 385/60 |
| 5,563,971 A | 10/1996 | Abendschein ................. 385/55 |
| 5,563,978 A | 10/1996 | Kawahara et al. .......... 385/136 |
| 5,724,466 A | 3/1998 | Rickenbach et al. .......... 385/60 |
| 5,737,464 A | 4/1998 | Underwood et al. .......... 385/72 |
| 5,764,834 A | 6/1998 | Hultermans ................... 385/60 |
| 5,781,680 A | 7/1998 | Womack et al. .............. 385/53 |
| 5,809,192 A * | 9/1998 | Manning et al. .............. 385/78 |
| 6,254,283 B1 * | 7/2001 | Novacoski et al. ........... 385/78 |

* cited by examiner

Primary Examiner—John D. Lee
Assistant Examiner—Jennifer Doan
(74) Attorney, Agent, or Firm—Roger C. Turner

(57) ABSTRACT

A fiber optic connector includes a plurality of alignment sleeves (50) that each lies in one of the passages (20) of a connector body (12), with each alignment sleeve being easily replaceable. Each alignment sleeve lies in a mount sleeve (80), with each mount sleeve having a front end with an inner flange (84) that prevents forward movement of the alignment sleeve. Each mount sleeve has a more rearward outer flange (90) forming a forwardly-facing shoulder (94). A retainer (100) includes resilient tines (106) that abut the forwardly-facing flange shoulder to prevent forward movement of the mount sleeve, but with the tines being expandable by a special tool (130) so the mount sleeve and alignment sleeve can be removed and replaced.

9 Claims, 3 Drawing Sheets

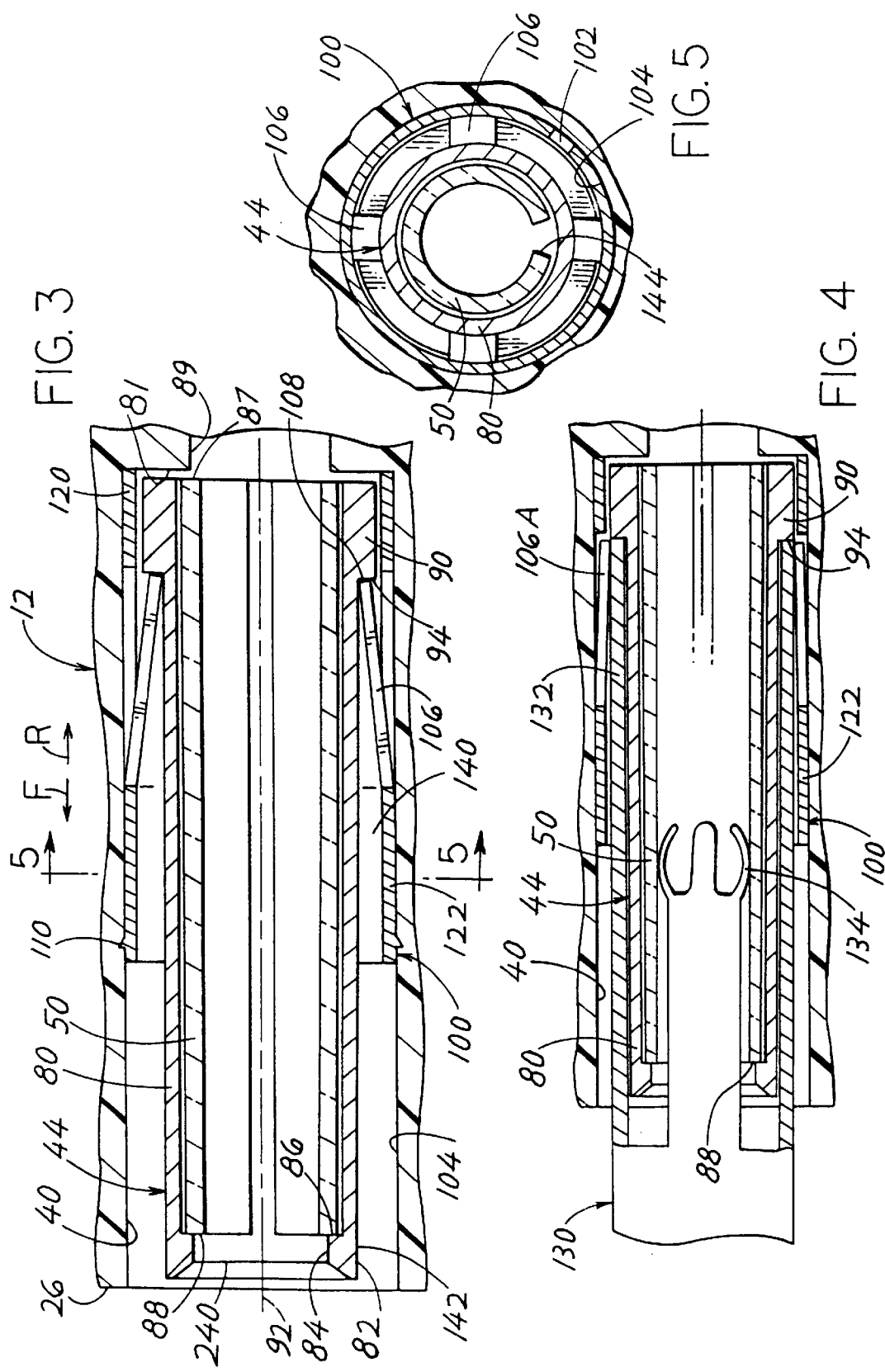

FIBER OPTIC CONNECTOR WITH REMOVABLE ALIGNMENT SLEEVE

BACKGROUND OF THE INVENTION

An optical fiber connector may include a connector body with numerous passages and an alignment assembly lying in a front portion of each passage. Each alignment assembly includes an alignment sleeve and may include an outer sleeve that surrounds the alignment sleeve. The alignment sleeve is commonly formed of ceramic, which is difficult to precisely machine, so it is commonly formed without any flanges, but with a slot that allows it to expand slightly. An optical fiber is fixed in a ferrule that slides forwardly into the alignment sleeve, with a mating ferrule and its optical fiber sliding rearwardly into the alignment sleeve until the tips of the ferrules and optical fibers abut.

Each body passage front portion may include a rearwardly-facing shoulder that prevents the alignment assembly from moving forward out of the passage. As a result, replacement of a damaged alignment assembly requires that it be pulled out of the rear end of the body. Such pullout from the rear end can be difficult because of the large number of optical cables extending from the rear of the body. The ceramic alignment sleeve is easily damaged, so it is highly desirable if an alignment assembly could be rapidly replaced with minimum manipulation. A fiber optic connector that enabled rapid replacement of an alignment sleeve from the front end of the connector body, would be of value.

SUMMARY OF THE INVENTION

In accordance with one embodiment of the present invention, an optical fiber connector is provided, which enables rapid replacement of an alignment assembly that includes an alignment sleeve, from the front mating end of the connector. The connector includes a body with at least one passage, and an alignment assembly lying in a front portion of the passage. The alignment assembly includes an alignment sleeve that receives two optical fibers that are to be coupled. A retainer lying in the front passage portion, abuts a forwardly-facing shoulder on the alignment assembly to retain the alignment assembly, but with the retainer being deflectable to expand it and enable pullout of the alignment assembly from the front end of the body passage. The body may include a plurality of rows and columns of passages, with an alignment assembly and retainer in each passage.

Each alignment assembly includes an outer sleeve, or mount sleeve, that surrounds the alignment sleeve. The mount sleeve has an internal flange at its front end to prevent forward movement of the alignment sleeve out of the mount sleeve. The mount sleeve also has an outside flange that forms a forwardly-facing shoulder, to be engaged by the retainer, to hold the alignment sleeve in the passage until the retainer is deflected to release the alignment assembly. The mount sleeve "floats" within the front passage portion, in that it can tilt by at least 1° to align itself with ferrules that are inserted into the alignment sleeve and that contain the optical fibers that are to be coupled. The retainer can include a sheet metal cylinder with slots that form tines, and with the cylinder having a cylindrical rear portion that surrounds the outside flange of the mount sleeve to closely locate the flange within the passage front portion.

The novel features of the invention are set forth with particularity in the appended claims. The invention will be best understood from the following description when read in conjunction with the accompanying drawings.

BRIEF DESCRIPTION OF THE DRAWINGS

FIG. 3 is an enlarged view of a portion of the connector of FIG. 2.

FIG. 4 is a view similar to that of FIG. 3, but showing a removal tool inserted into the passage to remove the alignment assembly.

FIG. 5 is a sectional view taken on line 5—5 of FIG. 3.

DESCRIPTION OF THE PREFERRED EMBODIMENTS

Figure 1:
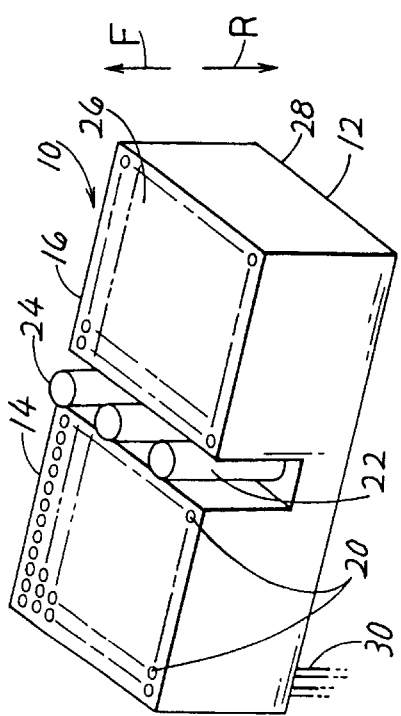
FIG. 1 is a front isometric view of a connector with multiple passages, constructed in accordance with one embodiment of the invention.

FIG. 1 illustrates an optical fiber connector 10 which includes a connector body 12 having two parts 14, 16, with each part having numerous passages 20 arranged in twelve rows and twelve columns, for a total of 288 passages in the entire connector. The connector 10 can mate to another connector by a pair of alignment posts 22, 24 sliding along holes in the mating connector while optical fiber ferrules that project from the mating connector slide into the passages 20. The body has front and rear ends 26, 28, with the front mating end face 26 lying closest to the mating connector and with numerous optical cables 30 projecting out of the rear end face of the body.

Figure 2:
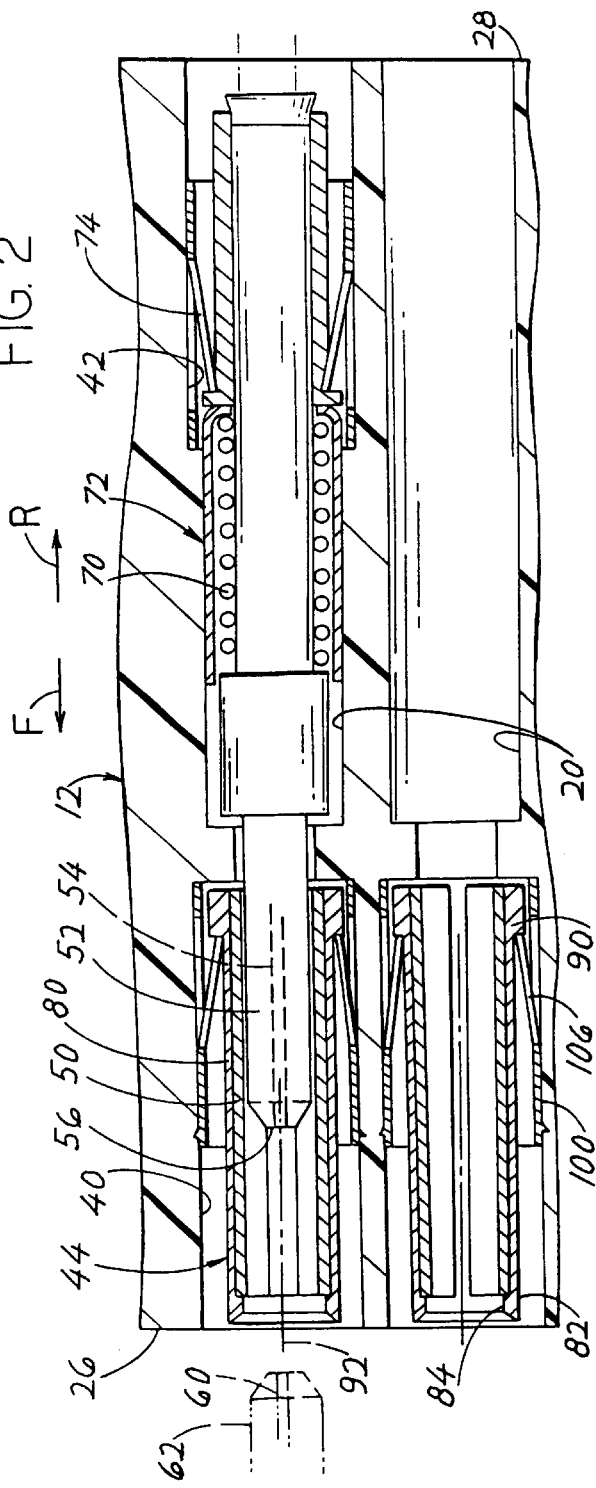
FIG. 2 is a sectional view of a portion of the connector of FIG. 1, with a cable holding assembly that includes a ferrule lying in the alignment assembly, shown in only one of the passages, and with a portion of a mating ferrule also shown.

FIG. 2 is a sectional view that shows two passages 20 of the connector. Each passage includes a front passage portion 40 leading to the front face 26 of the body and a rear passage portion 42 leading to the rear face 28 of the body. An alignment assembly 44 lies in the front portion of each passage. Each alignment assembly includes an alignment sleeve 50 that is designed to closely receive an optical fiber ferrule 52 that holds an optical fiber 54. Usually, the tip 56 of the fiber lies at the tip of the ferrule. A mating optical fiber 60 lies in a mating ferrule 62 that is inserted rearwardly R into the alignment sleeve 50 until the tips of the ferrules and of the fibers abut one another. At least one of the ferrules 52 is biased forwardly by a spring 70 of a cable holding assembly 72. The cable holding assembly lies in the rear passage portion 42 and is held therein by a clip 74 that can be deflected to release the cable holding assembly so as to pull it rearwardly out of the passage.

As also shown in FIG. 3, each alignment assembly 44 includes an outer sleeve, or mount sleeve 80 that surrounds the alignment sleeve 50 to position the alignment sleeve within the front passage portion and to prevent the alignment sleeve from moving forwardly F out of the passage. The mount sleeve 80 has a front end 82 with an internal flange 84 forming a rearwardly facing shoulder 86. The shoulder 86 can abut the front end 88 of the alignment sleeve 50 to prevent the alignment sleeve from moving forwardly out of the passage. The front passage portion has a rear end forming a forwardly-facing shoulder 82 that can abut the alignment assembly. The rear end 87 of the alignment sleeve has an outside diameter slightly smaller than the diameter of a connecting passage portion 89, to keep the alignment sleeve in the mount sleeve. The mount sleeve 80 also includes an outer flange 90 that projects radially outwardly with respect to the passage axis 92, and that forms a forwardly-facing shoulder 94 (a shoulder that faces at least partially forward). A retainer 100 lying in the front passage portion, has tines 106 that abut the shoulder 94 to prevent the mount sleeve from moving forwardly.

The retainer 100, shown in FIG. 3, is in the form of a sheet metal cylinder with a gap 102 (FIG. 5) in the cylinder that allows it to expand against the walls 104 (FIG. 3) of the passage front portion. The sheet metal cylinder has slits in it that form tines 106 that extend at forward and radially inward (toward axis 92) inclines. The tines have free rear ends 108 that abut the shoulder 94 on the mount sleeve outer flange 90. The retainer 100 is prevented from forward movement by heat stake barbs 110 that bite into the walls of the front passage portion, when the front passage portion is heated so as to soften it to allow the barbs to bite in. Of course, the front passage portion could be formed with a rearwardly-facing shoulder to abut the front end of the retainer, but this would increase the cost of making the body.

The retainer, which is formed from a piece of sheet metal that has been rolled into a cylinder, has a rear end 120 (FIG. 3) that lies immediately outside the outer flange 90 in the mount sleeve. The retainer tube rear end 120 centers the outer flange 90 within the passage front portion 40.

FIG. 4 shows the manner in which an alignment assembly 44 can be easily removed from the front passage portion 40 in the body. A special removal tool 130 is provided, with a cylindrical removal cylinder 132 that has an inner diameter greater than the outside diameter of the mount sleeve 80 forward of its outer flange 90. The removal cylinder has an outside diameter less than the inside diameter of the retainer 100 at the retainer front end 122 and at the tines 106 when the tines 106 are deflected radially outwardly against the walls of the front passage portion. The removal tool also has a gripper 134 that enters less than half the length of the alignment sleeve 50 to grasp it. As a result, when the fully inserted retention tool 130 is pulled forwardly, the gripper 134 pulls the alignment sleeve 50 forwardly. The front end 88 of the alignment sleeve pushes the mount sleeve 80 forwardly. The mount sleeve is not prevented from moving forwardly because the front ends of the expanded tines at 106A do not engage the forwardly-facing shoulder 94 on the outer flange 90.

Thus, if one of the alignment sleeves should break, the alignment assembly can be removed by merely inserting the removal tool 130 to the position shown in FIG. 5, and then pulling it out of the body. The alignment tool does not have to be turned to unthread anything. The retainer remains behind for holding a replacement alignment assembly. Each alignment assembly can be installed by merely pushing it rearwardly into the passage until the retainer tines snap in front of the outer flange shoulder 94, which can be detected by tactile feedback. Rapid installation of perhaps 288 alignment assemblies is desirable.

FIG. 3 shows that a space 140 is left between the outer surface 142 of the mount sleeve up to the outer flange 90, and the inside of the retainer 100. This space 140 is necessary to provide room for the removal cylinder of the removal tool. However, this space 140 results in only a small additional diameter required for each front passage portion. It is noted that it is desirable to make each passage portion of a small diameter, so a large number, such as the 288 passages shown in FIG. 3, can fit into a connector of moderate size.

It is noted that the alignment assembly 44 can "float" within the front passage portion, in that the front end of the alignment assembly can tilt by at least 1° and preferably a plurality of degrees with respect to the axis 92 of the passage. This is desirable in allowing the alignment assembly to tilt when receiving the optical fiber ferrule 52 as is shown in FIG. 2. Radial movement of the rear end of the alignment assembly is limited by the rear end 120 of the retainer. When the ferrule 52 is inserted forwardly into the alignment assembly, it aligns the assembly with the axis 92.

FIG. 5 shows that the alignment sleeve 50 has a gap 144 in it which allows it to expand slightly within the mount sleeve 80. Such slight expansion assures that each ferrule entering the alignment sleeve will lie in a slight interference fit with the alignment sleeve to very precisely align the two ferrules. The outside of the alignment sleeve is made slightly smaller than the inside diameter of the mount sleeve 80 to provide for such slight expansion of the alignment sleeve.

Figure 6:
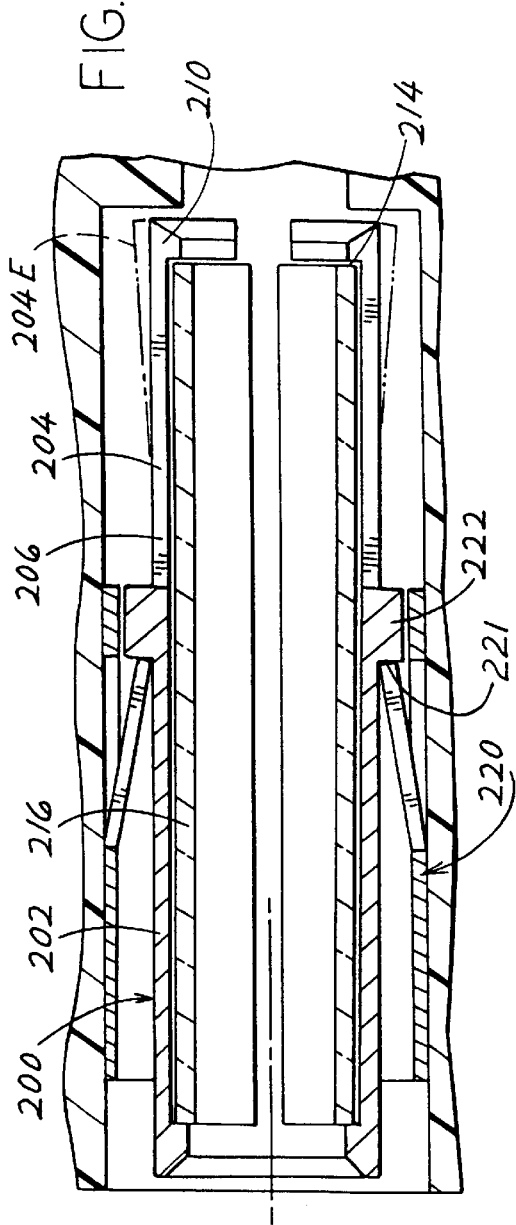
FIG. 6 is a sectional view of a portion of a connector with an alignment assembly of another embodiment of the invention.

FIG. 6 illustrates an alignment sleeve 200 of another embodiment of the invention, wherein the mount sleeve 202 of an alignment assembly 216 has a rear portion 204 with slots 206 that allow the rear portion to expand, as to the position shown at 204E. Also, the mount sleeve rear portion 204 has a rear end forming an internal flange 210 that abuts the rear end 214 of the alignment sleeve 216. The alignment sleeve 216 can be pushed forwardly into the mount sleeve by expansion of the rear portion of the mount sleeve, until the flange 210 snaps behind the alignment sleeve to trap it in place. The advantage of this arrangement is that only a single unit that includes the alignment assembly 200 has to be handled, without possibility that the alignment sleeve will accidentally fall out of the mount sleeve during handling, and before the alignment sleeve is installed in the body. The retainer 220 is similar to that of FIG. 3, except that its position is more forward to abut the forward end shoulder 221 of the more forward outer flange 222 of the modified mount sleeve 202.

Figure 7:
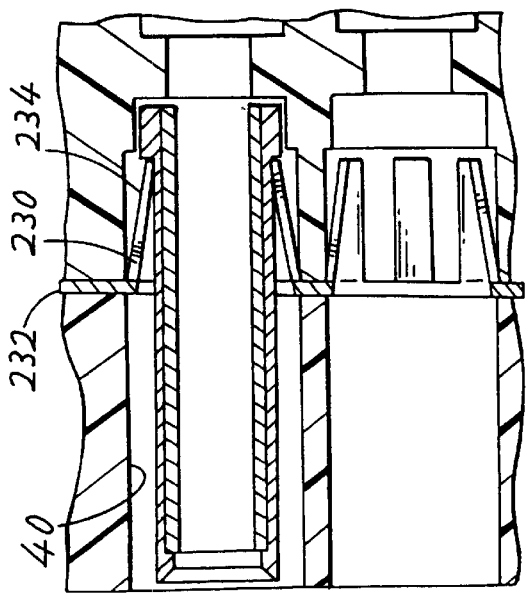
FIG. 7 is a sectional view of a portion of a connector constructed in accordance with another embodiment of the invention.

FIG. 7 shows one of many types of retainers 230 that can be used. The particular retainer 230 is a portion of a plate 232 that has conical parts 234 lying in each of the passage front portions 40, with each conical part 234 having slots dividing it into tines that can be expanded. This type of retainer is known in the art of electrical connectors.

It may be noted in the drawings, such as FIG. 3, that the front end 82 of the alignment sleeve lies no further forward than the front face 26 of the body. This protects the alignment sleeves from damage. Although it is possible for the front ends of the alignment assemblies to project forward of the body front face, this generally requires that the alignment assemblies be prevented from tilting about axes that are perpendicular to the passage axis 92. Such tilt prevention might hamper the insertion of a removal tool.

In a connector of the construction illustrated in FIGS. 1–5 that applicant has designed, the alignment sleeve 50 (FIG. 5) has an inside diameter of 1.25 mm, an outside diameter of 1.62 mm, and a length of 10 mm. The mount sleeve 80 had an inside diameter of 1.8 mm and an outside diameter of 2.2 mm except at its outer flange 90. The wall thickness of the mount sleeve of the mounting flange (0.2 mm) is about the same as that of the alignment sleeve, to minimize the require diameter of the passage.

Thus, the invention provides an optical fiber connector that includes a body with at least one passage and preferably multiple passages, and with an alignment assembly lying in the front portion of each passage. Each alignment assembly includes an alignment sleeve lying within a mount sleeve, where the mount sleeve has a front end with an internal flange that abuts the alignment sleeve and has a more rearward outer flange with a forwardly-facing shoulder. A retainer that is coupled to the body to prevent forward movement of the alignment assembly, abuts the shoulder on the outer flange of the mount sleeve, to prevent forward movement of the mount sleeve. The retainer can be detached from the mount sleeve by using a retainer that can be expanded, so the mount sleeve with alignment sleeve therein can be removed from the passage while the retainer remains behind.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optical fiber connector comprising:

a connector body that has a front mating end and a rear end, said body having a plurality of passages extending between said ends with each passage having front and rear passage portions;

a plurality of alignment assemblies each lying in one of said front passage portions, with each alignment assembly including an alignment sleeve with an inside for receiving a pair of optical fiber ferrules to align them, and with said alignment assembly including a mount sleeve with a rearwardly-facing shoulder that abuts a front end of said alignment sleeve and that has an outside with a forwardly-facing shoulder, each front passage portion having an open front end and each alignment assembly is slideable out of the open front end of a corresponding front passage portion;

a plurality of retainers that each engages said body and the forwardly-facing shoulder of one of said mount sleeves to prevent forward movement of the corresponding alignment assembly, but with each retainer being radially deflectable to enable forward movement of the corresponding alignment assembly out of the corresponding passage.

2. The connector described in claim 1 wherein:

each of said passages has a passage axis and has a forwardly-facing shoulder at a rear end of the front passage portion thereof, and each alignment assembly has a rear end that abuts the shoulder of the corresponding passage;

each alignment assembly lies free floating and completely within the corresponding front passage portion so the alignment assembly is tiltable by at least one degree about an imaginary axis extending perpendicular to the passage axis but is protected from accidental damage.

3. The connector described in claim 1 wherein:

said alignment assembly has an outer flange forming said forwardly-facing shoulder;

each of said retainers comprises a tube with front and rear ends and with a plurality of slots forming tines with free rear ends abutting the shoulder of the corresponding alignment assembly, with each tube rear end closely surrounding the outer flange of the corresponding alignment assembly.

4. The connector described in claim 1 wherein:

said mount sleeve of each alignment assembly surrounds the alignment sleeve, the mount sleeve having an outside flange forming said forwardly-facing shoulder, and the mount sleeve having a front end with an internal flange that forms said rearwardly-facing shoulder that abuts a front end of said alignment sleeve.

5. The connector described in claim 1 wherein:

each of said retainers is constructed to be radially expandable, and is mounted in its passage front portion to prevent its removal when it is expanded and the corresponding alignment assembly is pulled forwardly out of the passage front portion.

6. An optical fiber connector comprising:

a connector body that has a front mating face and a rear face, said body having at least one passageway extending between said faces of said body with said passageway having front and rear passage portions;

an alignment assembly lying substantially completely within said front passage portion, said assembly including an optical fiber alignment sleeve and an outer mount sleeve surrounding the alignment sleeve;

said mount sleeve having a front end with an internal flange that abuts the alignment sleeve to prevent its forward movement out of the mount sleeve, and said mount sleeve having an outer flange with a front surface lying rearward of said internal flange;

a retainer that is coupled to said body to prevent retainer forward movement beyond said front mating face and out of said passageway, with said retainer abutting said front surface of said outer flange to prevent forward movement of said alignment assembly, but with said retainer being deflectable to allow said alignment assembly to slide forward out of said passage.

7. The connector described in claim 6 wherein:

said mount sleeve has a sleeve rear portion with a plurality of slots therein to allow said sleeve rear portion to expand to slide said alignment sleeve through said sleeve rear portion fully into said mount sleeve, and with said sleeve rear portion having an internal flange to abut a rear end of said alignment sleeve.

8. An optical fiber connector comprising:

a connector body that has a front mating end and a rear end, said body having a plurality of passages extending between said ends with each passage having front and rear passage portions, each passage front portion having an axis;

a plurality of alignment assemblies each lying in one of said front passage portions, with each alignment assembly including an alignment sleeve with an inside for receiving a pair of optical fiber ferrules to align them, and with said alignment assembly including a mount sleeve with a rearwardly-facing shoulder that abuts a front end of said alignment sleeve and that has an outside with a forwardly-facing shoulder, each front passage portion having an open front end;

a plurality of retainers that each engages said body and the forwardly-facing shoulder of one of said mount sleeves to prevent forward movement of the corresponding alignment assembly, but with each retainer being radially deflectable to enable forward movement of the corresponding alignment assembly out of the corresponding passage;

each of said retainers includes a plurality of tines with front and rear tine ends, with said tine rear ends abutting said shoulder and with said tines each extending at a rearward and radially inward incline from the tine front end to the tine rear end, with the tines being radially outwardly deflectable to allow the alignment assembly to be pulled forwardly out of the corresponding passage.

9. An optical fiber connector comprising:

a connector body that has a front mating face and a rear face, said body having at least one passage extending between said faces of said body with said passage having front and rear passage portions and having an axis;

an alignment assembly lying substantially completely within said front passage portion, said assembly including an optical fiber alignment sleeve and an outer mount sleeve surrounding the alignment sleeve;

said mount sleeve having a front end with an internal flange that abuts the alignment sleeve to prevent its forward movement out of the mount sleeve, and said mount sleeve having an outer flange with a front surface lying rearward of said internal flange;

a retainer that is coupled to said body to prevent retainer forward movement beyond said front mating face and out of said passage, with said retainer abutting said front surface of said outer flange to prevent forward movement of said alignment assembly, but with said retainer being deflectable to allow said alignment assembly to slide forward out of said passage;

said retainer includes a plurality of tines extending rearward and radially inward and engaging said front surface of said outside flange, with said tines being deflectable radially outwardly to pass said outer flange.

* * * * *